United States Patent
Shiota et al.

[11] Patent Number: 5,838,396
[45] Date of Patent: Nov. 17, 1998

[54] PROJECTION TYPE IMAGE DISPLAY APPARATUS WITH CIRCUIT FOR CORRECTING LUMINANCE NONUNIFORMITY

[75] Inventors: Tetsuro Shiota, Takatsuki; Hiroshi Miyai, Takarazuka; Hitoshi Noda, Moriguchi, all of Japan

[73] Assignee: Matsushita Electric Industrial Co., Ltd., Osaka, Japan

[21] Appl. No.: 571,379

[22] Filed: Dec. 13, 1995

[30] Foreign Application Priority Data

Dec. 14, 1994 [JP] Japan ..................... 6-310397

[51] Int. Cl.⁶ .................. H04N 9/31; H04N 9/69
[52] U.S. Cl. ............... 348/745; 348/383; 348/647; 348/675; 348/677
[58] Field of Search .................... 348/645, 646, 348/647, 648, 674, 675, 676, 677, 745, 806, 807, 808, 189, 191, 383, 190, 673; H04N 9/69, 9/31

[56] References Cited

U.S. PATENT DOCUMENTS

| | | | |
|---|---|---|---|
| 4,123,775 | 10/1978 | Bugni | 348/191 |
| 4,403,251 | 9/1983 | Domarenok et al. | 348/164 |
| 4,473,844 | 9/1984 | Klein | 348/251 |
| 4,547,797 | 10/1985 | Mick | 348/675 |
| 4,553,164 | 11/1985 | Labb | 348/615 |
| 4,631,576 | 12/1986 | St. John | 348/807 |
| 4,866,511 | 9/1989 | Belmares-Sarabia et al. | 348/645 |
| 5,260,797 | 11/1993 | Muraji et al. | 358/231 |
| 5,424,781 | 6/1995 | Vlahos | 348/587 |
| 5,510,851 | 4/1996 | Foley et al. | 348/189 |

FOREIGN PATENT DOCUMENTS 61-243495  10/1986  Japan ................. H04N 5/66

*Primary Examiner*—John K. Peng
*Assistant Examiner*—Jeffrey S. Murrell
*Attorney, Agent, or Firm*—Ratner & Prestia

[57] ABSTRACT

In a projection type image display apparatus, the screen is divided and a memory to record luminance correction data corresponding to the divided regions is provided, and addresses of the divided regions of the screen are set by an address counter, synchronized with the input video signal. The luminance correction data are read successively by inputting the addresses to the memory, and luminance non-uniformity on the screen is corrected through operational processing of the correction value converted in an analog value by a D/A converter and the input video signal. The luminance correction data is obtained by computing measurement results of respective luminance characteristics of red, green, and blue colors on the screen and separately recorded as an amplitude correction component and a DC level correction component. By multiplying and adding the correction data to the input video signal respectively, non-uniformities in luminance and color from low luminance level to high luminance level can be precisely corrected. Also, as the read start position and read direction of the memory can be set corresponding to sweep direction of a projection type image display apparatus, the projection direction to the screen in a projection type image display apparatus can be easily changed without affecting the operation of luminance correction.

10 Claims, 6 Drawing Sheets

PROJECTION TYPE IMAGE DISPLAY APPARATUS WITH CIRCUIT FOR CORRECTING LUMINANCE NONUNIFORMITY

FIELD OF THE INVENTION

The present invention relates to a projection type image display apparatus, and more specifically to a projection type image display apparatus with a circuit for correcting luminance nonuniformity on its projection screen.

BACKGROUND OF THE INVENTION

Recently, as projection screens of color projection type image display apparatuses have become wider, a circuit has been required (1) for correcting non-uniform luminance on the screen for the red, green, and blue colors caused by the dispersion of light sources and light valves of the apparatus and caused by the peripheral dimming characteristics of a projection lens, and (2) for correcting color nonuniformity when the colors are multiplied on the projection screen. A method disclosed in Japanese laid-open patent application 61-243495 is described below as an example.

First, a video signal of a specific brightness level is inputted to a projection type image display apparatus to project the image on the screen. The projection region of the screen is then properly divided, and a luminance level of each of the divided regions is measured by a video camera unit and compared with an objective luminance level. The differences between the measured data and the objective luminance levels are stored in a memory as luminance correction data. The memory recording the correction data is assembled in a luminance correction circuit of the projection type image display apparatus. The correction data is read from the memory using the addresses corresponding to the regions that were divided when measuring, which are computed from horizontal and vertical synchronizing signals of the input video signal. The correction data are converted into analog value by a D/A converting circuit. The analog correction values are then added to the input video signal by an adder. Using this added video signal, a light valve such as a liquid crystal display of a projection type image display apparatus is driven, so that nonuniformity in luminance and color on the screen can be corrected.

However, because the luminance measurement for making the correction data is performed at a specific brightness level of an input video signal, nonuniformities in luminance and color in all video input signals ranging from low brightness (near black level) to high brightness (near white level) cannot always be corrected.

Another method, described below, was proposed to avoid the above limitations. In this proposed method, a region on a screen is properly divided in the same manner as in the above example. Luminances of the divided regions on the screen are measured by a video camera unit while changing the brightness levels of the input video signal successively. Corrected brightness data necessary to get the objective luminance are stored in a memory in the form of a look-up-table. This corrected brightness data corresponds to each of the regions and each of the input video signal brightness levels. The memory is then assembled in a projection type image display apparatus. The corrected brightness data are read from the look up table of the memory by using complex addresses. These complex addresses are composed of: (1) addresses for specifying a region and are computed from horizontal and vertical synchronizing signals of an input video signal such that they correspond to a divided region in which the luminance was measured, and (2) addresses for specifying a brightness level obtained by A/D conversion of the brightness level of the input video signal. The brightness data read out is converted into an analog value by a D/A converting circuit, and thereby a light valve is driven to correct luminance nonuniformity on the screen. When a projection type image display apparatus is a color type, the correcting operation described above is applied to the red, green, and blue colors respectively, so that not only luminance nonuniformity but also color nonuniformity can be corrected.

However, in this method, the entire range of brightness levels of an input video signal is divided finely, and a look-up-table of objective brightness data is formed for each of the divided levels and for each color. Thus, a large memory is required. Besides, the input video signal must be A/D converted beforehand. Therefore, a luminance nonuniformity correction circuit cannot be formed at a low price.

Further, in projection type image display apparatuses, the ability to change projection direction, for example from front projection to rear projection, and also, change the installation position, for example, floor or ceiling mounting, is required. As the nonuniformity on the screen is affected by the projection directions and installation conditions, proper luminance correction corresponding to these potential changes is required.

SUMMARY OF THE INVENTION

In view of the foregoing, the present invention performs correction of nonuniformities in luminance and color on the screen accurately and at a low price, and covers all brightness levels of an input video signal. The present invention also provides a projection type image display apparatus which can correct luminance corresponding to the changes of projection directions or installation positions of the projection type image display apparatus.

A projection type image display apparatus of a first embodiment of the invention comprises: a memory device for storing digital data of the amplitude and the direct current level for correcting nonuniformity of luminance of a projected image on a screen for at least one of the colors red, green, and blue (hereafter abbreviated as R, G, B) video signals; a D/A converter for converting the digital data read from the memory device to an analog signal; a correction operation means for correcting the video signal by the output signal from the D/A converter. By the correction operation means, both amplitude and DC level of at least one of R, G, and B video signals are corrected.

A projection type image display apparatus of a second embodiment of the invention comprises: a memory device for storing digital data of the amplitude and the direct current level for correcting nonuniformity of luminance of a projected image on a screen for at least one of R, G, and B color video signals, said memory device capable of being designated its start position and read direction corresponding to a change of sweep directions of the projection type image display apparatus; a D/A converter for converting the digital data read from the memory device to an analog signal; a correction operation means for correcting the video signal by the output signal from the D/A converter. By the correction operational means, both amplitude and DC level of at least one of R, G, and B video signals are corrected.

Further, in another words, an embodiment of the present invention comprises: a linear approximation means for approximating luminance characteristics on a projection screen; means for determining the inclination of the luminance characteristics approximated by the linear approximation means; means for determining the amount of parallel shift of the luminance characteristics in the luminance level direction; wherein the amplitude of the input video signal is controlled according to the data determined by the means for determining the inclination, and the DC level of the input video signal is controlled according to the data determined by the means for determining the amount of parallel shift.

In the structure of the invention described above, since both the amplitude and the DC level of the input video signal are corrected by luminance correcting data, nonuniformities in luminance and color corresponding to the input video signal brightness levels which widely range from a low brightness signal level to a high brightness signal level and to all over the screen projection area, can be performed without using a lookup-table.

Also, even if the position of the nonuniformity is changed due to change of the projection direction or installation position, by reading correction data from a memory device by designating addresses of read out position and read out direction, correction of the luminance nonuniformity and color nonuniformity can be achieved corresponding to the change of nonuniformity in positions.

The foregoing and other features and aspects of the present invention will be better understood from the following detailed description of the invention when considered in conjunction with the accompanying drawings.

DETAILED DESCRIPTION OF THE INVENTION

A projection type image display apparatus of an embodiment of the invention will be described with reference to the drawings.

Figure 1:
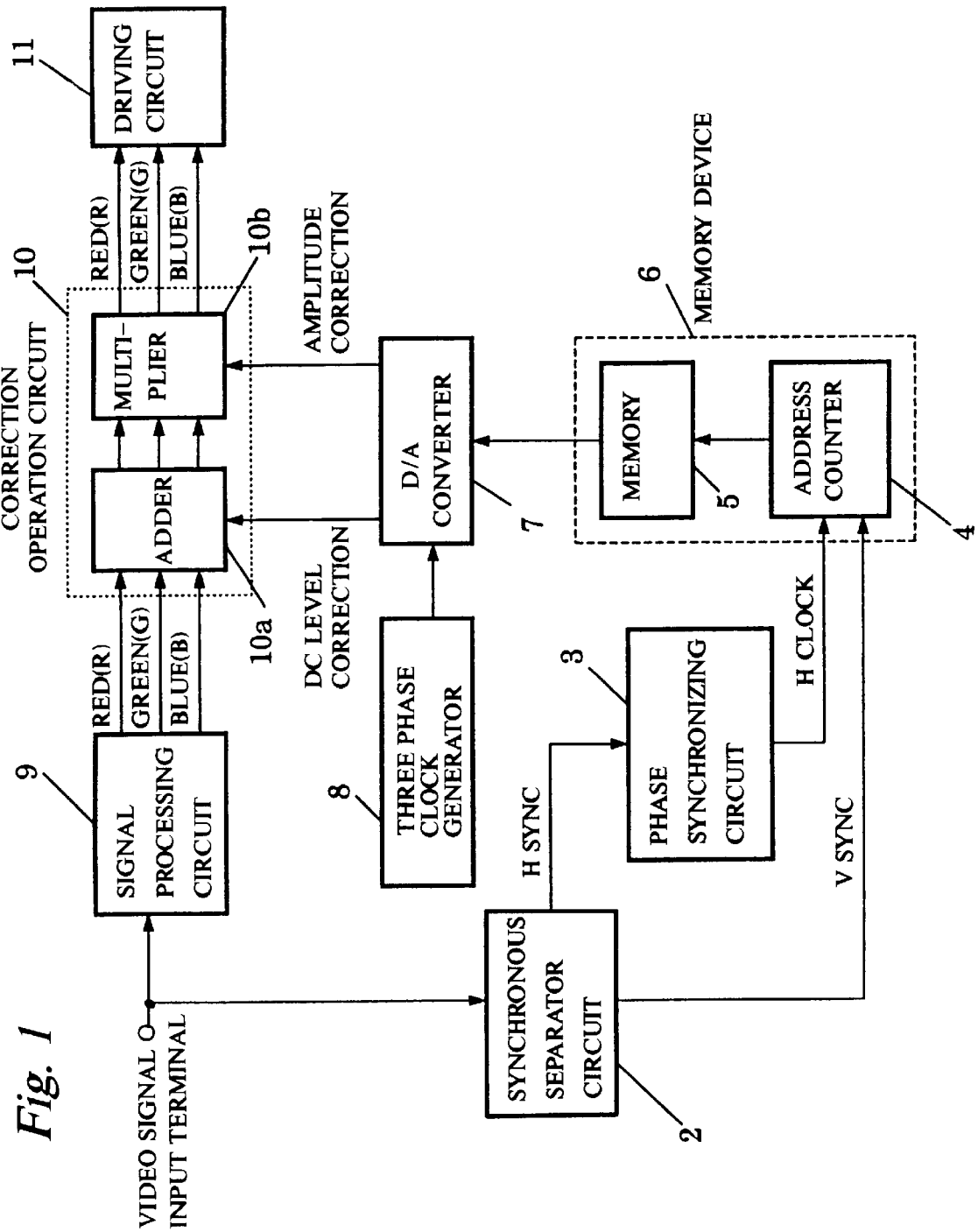
FIG. 1 is a block diagram showing a structure of a projection type image display apparatus in accordance with a first embodiment of the present invention.

FIG. 1 is a block diagram showing a structure of a projection type image display apparatus in accordance with a first embodiment of the present invention.

In FIG. 1, a video signal inputted from a video input terminal 1 is converted into color video signals of red, green, and blue (R, G, and B, respectively) by signal processing circuit 9. The input video signal is also inputted to synchronous separator circuit 2 to be separated into a horizontal synchronizing signal and a vertical synchronizing signal and then outputted. The horizontal synchronizing signal is inputted to phase synchronizing circuit 3 to generate a horizontal synchronizing clock which is phase synchronized with the horizontal synchronizing signal of the input video signal. By inputting the horizontal synchronizing clock and the vertical synchronizing signal into the address counter 4, addresses corresponding to positions on a screen divided in a matrix structure are generated. Memory device 6 is composed of address counter 4 and memory 5 in which correction data of DC levels and amplitudes of R, G, and B corresponding to respective regions on the screen divided in a matrix structure are stored. The correction data is computed by the method as described below with reference to FIG. 4. Accordingly, by inputting addresses corresponding to the divided regions to memory 5, the correction data of DC levels and amplitudes of R, G, and B corresponding to each of the regions on the screen which is divided into a matrix are read out. The data that is read out is inputted to D/A converter 7. D/A converter 7 latches every R, G, and B signal by clocks and three phase clock generating circuit 8, and a DC level correction value and an amplitude correction value of the analog signal are outputted from D/A converter 7.

FIG. 2 and FIGS. 3(a)–(e) are a block diagram and a timing chart, respectively, for read out operation of the correction data corresponding to respective video signals of R, G, and B colors from a memory by using three phase clock signals and for illustrating the D/A converting operation of the data.

In FIG. 3(a), R1, G1, and B1 indicate the correction data corresponding to each R, G, and B in a first region divided on the screen, R2, G2, and B2 indicate the correction data corresponding to each R, G, and B in a second region situated next to the first region. The correction data are stored in an order of R1, G1, B1, R2, G2, B2 in memory 5 in FIG. 2. This data is outputted successively from memory 5, synchronizing with the original period clock shown in FIG. 3(b). To D/A convert the data that is divided into R, G, and B components, three phase clocks formed by three time frequency dividing of the original period clock and respective phase shifting by one period of the original period clock, each as shown in FIGS. 3(c), 3(d), and 3(e), are applied respectively to D/A converters of R, G, and B as latch timing pulses.

Figure 2:
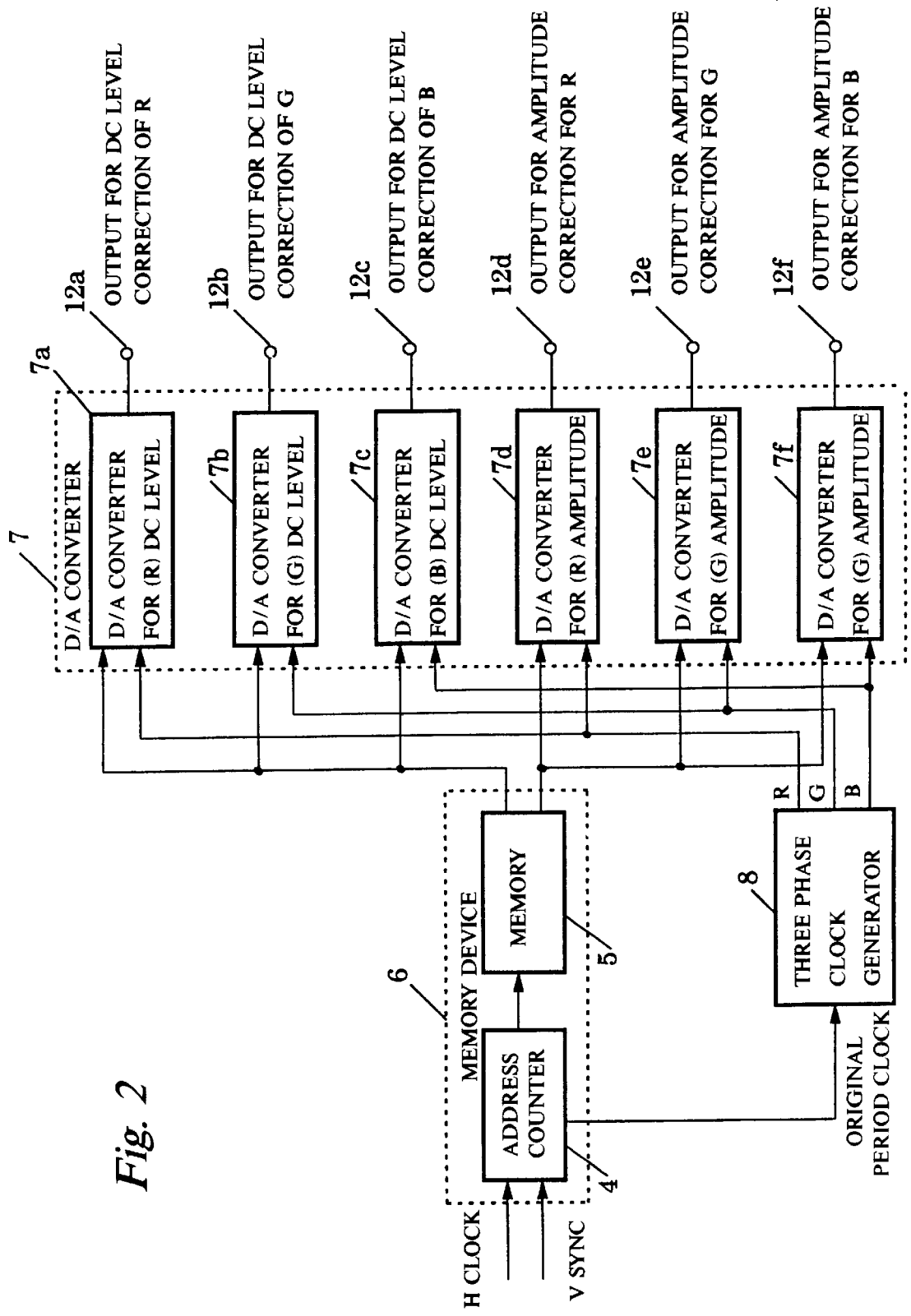
FIG. 2 is a block diagram for illustrating a read out method from a memory device when three-phase clocks are used.

FIG. 2 is a block diagram for realizing the operation of FIGS. 3(a)–(e). In FIG. 2, a horizontal synchronizing clock which is phase synchronized with the input video signal and a vertical synchronizing signal are inputted to address counter 4, and addresses corresponding to a region determined by the horizontal synchronizing clock and the vertical synchronizing signal are further divided into three addresses by the original period clock in address counter 4 and thereby addresses in memory 5 are set. Therefore, data of each region is outputted from memory 5 in the order of R, G, B as shown in FIG. 3(a). The original period clock output from address counter 4 is inputted to three phase clock generator circuit 8, and three phase clocks which are frequency divided by three from the original period clock and delayed sequentially by one original period each are generated as shown in FIGS. 3(c), 3(d), and 3(e).

Figure 3:
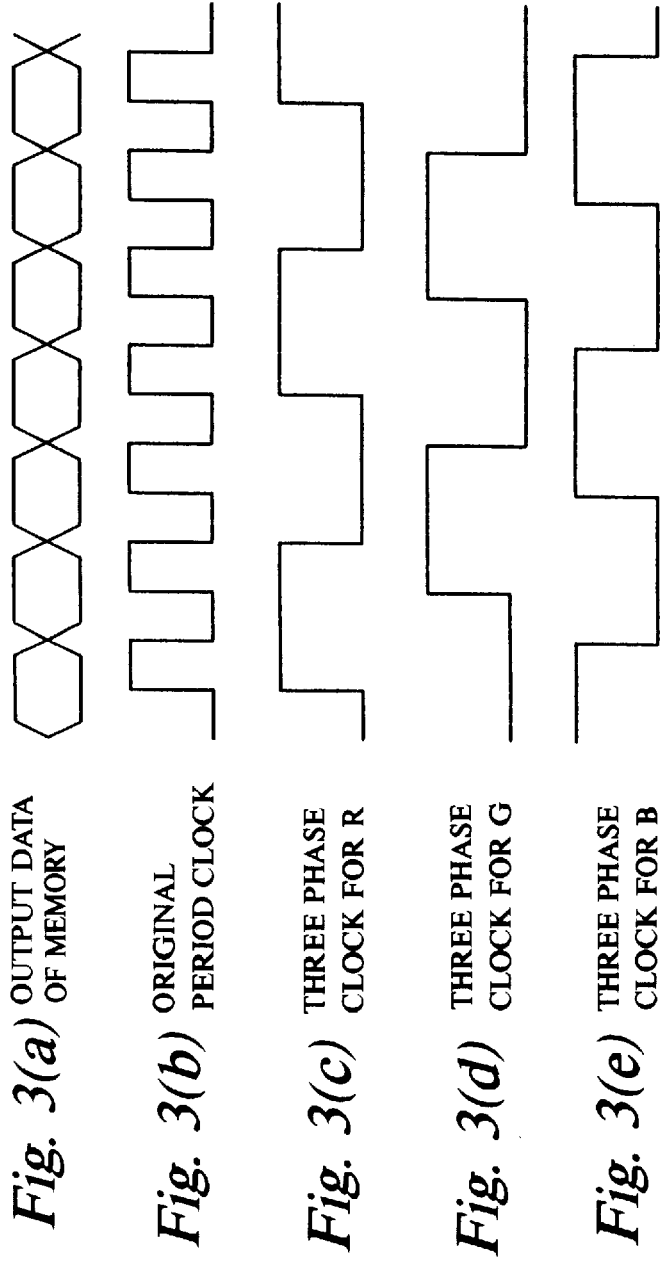
FIGS. 3(a)–3(e) are timing charts for illustrating the read out method from the memory device when three-phase clocks are used.

At this time, since DC level data and amplitude data are outputted in parallel from the memory, the output of the memory 5 can be inputted in parallel, respectively, to D/A converter 7a for DC level data of R signal, D/A converter 7d for amplitude data of R signal, D/A converter 7b for DC level data of G signal, D/A converter 7e for amplitude data of G signal, D/A converter 7c for DC level data of B signal, and D/A converter 7f for amplitude data of B signal. Also, a three phase clock shown in FIG. 3(c) is inputted to these D/A converters 7a, 7d, a three phase clock shown in FIG. 3(d) to 7b, 7e, a three phase clock shown in FIG. 3 (e) to 7c, 7f as the latch pulses for respective D/A converters from three phase clock generating circuit 8. Finally, analog DC level correction data and amplitude correction data for each of the R, G, and B signals are outputted at output ports of D/A converters 12a, 12b, 12c, 12d, 12e, and 12f, corresponding to each one of the divided regions on the screen.

Likewise, since correction data of R, G, and B are read out by synchronizing with the three phase clock, there is no need to provide memories for correction data for R, G, and B separately. Thus, the cost of the memory is minimized.

The DC level correction signals corresponding to the R, G, and B output from D/A converters 7a, 7b, and 7c shown in FIG. 2 are respectively inputted into adder 10a of correction operation circuit 10 in FIG. 1, and respectively added to the R, G, and B components of the input video signal. Next, the added signal is inputted to multiplier 10b of correction operation circuit 10 to be multiplied with the amplitude correction signals corresponding to the R, G, and B output from D/A converters 7d, 7e, and 7f in FIG. 2. By this addition and multiplication processing, the output of the brightness signals of R, G, and B which are DC level and amplitude corrected in every divided region are outputted from correction operation circuit 10. By these signals, the driving circuit 11 of a projection type image display apparatus is driven. Thus, images without nonuniformity of luminance can be projected covering the entire screen area and all luminance levels.

Here, if the order of the adder 10a and the multiplier 10b in the correction operation circuit 10 in FIG. 1 is switched, the same correction effect can be obtained if the computing process of the correction data stored in the memory is also switched accordingly.

A light valve driven by driving circuit 11 in FIG. 1 can be a liquid crystal or other devices. It is obvious that the correction method of luminance nonuniformity above can be generally applied to any light valve.

Because the correction operation circuit is composed of an analog adder and an analog multiplier, it can be realized by simple operational amplifiers. Moreover, there is no need to A/D convert the input video signal, so a low price luminance nonuniformity correction circuit can be provided.

Figure 4:
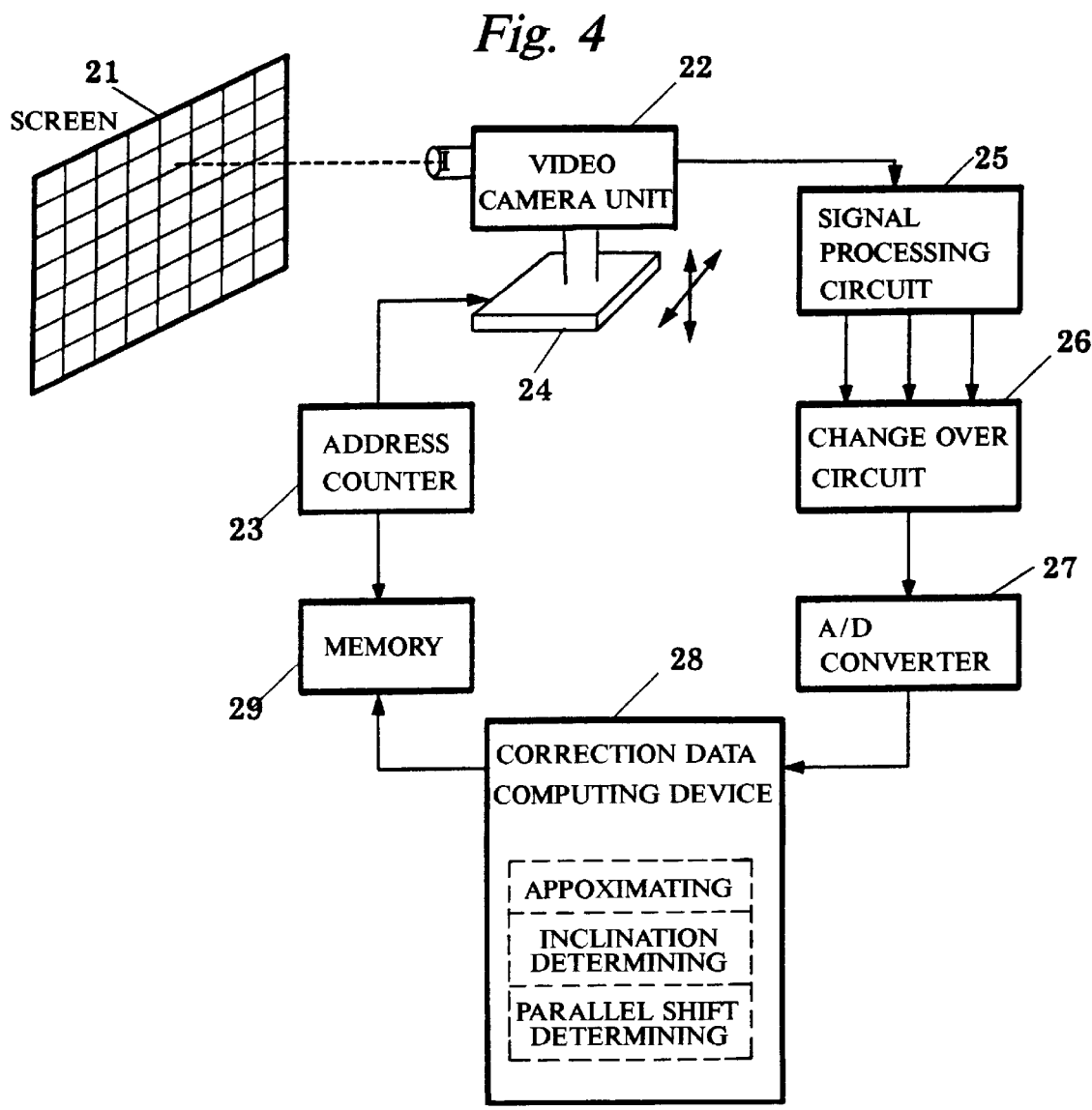
FIG. 4 is a block diagram for illustrating a method for making correction data to be inputted in a memory device.

FIG. 4 is a block diagram for illustrating a process for making the correction data to be recorded in memory 5 in FIG. 1. In FIG. 4, a projection type image display apparatus (not shown) projects an image of specific luminance on a screen 21 (for example projects 80 IRE brightness level of the input video signal). The luminance of the screen is measured by video camera unit 22 installed a specific distance in front of screen 21. The screen is divided into equal imaginary intervals in the horizontal and vertical directions to define hundreds of regions, and addresses in memory 29 are designated by the output from the address counter 23 corresponding to the above divided regions. Meanwhile, moving table 24 which carries video camera unit 22 is driven in the horizontal and vertical directions by the output from the address counter 23, and then luminances at the divided regions are measured successively. Luminance output from video camera unit 22 is separated into R, G, and B by signal processing circuit 25 and inputted to change over circuit 26. Change over circuit 26 outputs luminance signals of R, G, and B which change over, one by one, by commands from address counter 23. The output of change over circuit 26 is inputted to A/D converter 27. The converted luminance data of R, G, and B from A/D converter 27 are inputted to correction data computing device 28.

The input luminance level of the projection type image display apparatus is then changed (for example, projected by a brightness level of 20 IRE of the input video signal) and projected onto the screen, and the luminance data is inputted to correction data computing device 28 in the same manner as above. In the measurement, $\gamma$ correction is carried out beforehand in signal processing circuit 25. Thus, large nonlinearity of luminance characteristics and large sensitive dispersion of R, G, and B are already roughly corrected, and therefore, accordingly measured luminance characteristics can be linearly approximated in correction data computing device 28 by the data measured at two luminance levels. Also, in correction data computing device 28, correction data of DC level and amplitude for each R, G, and B are computed from the differences between the objective luminance characteristics and the measured luminance characteristics.

Figure 5A:
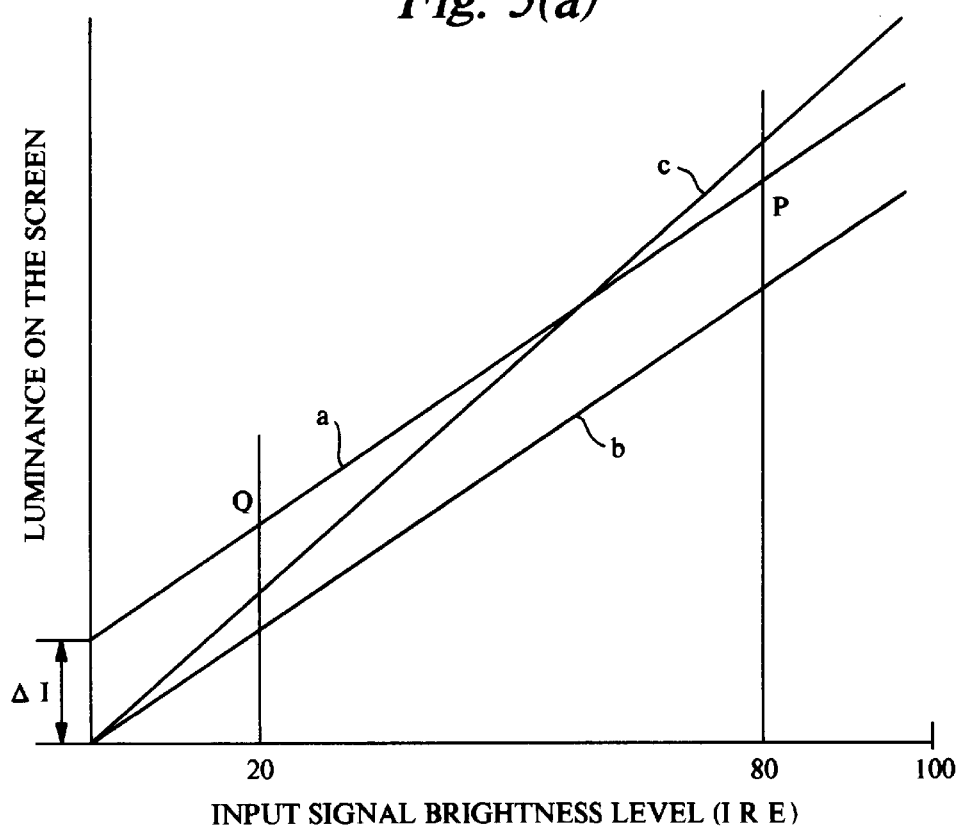
FIGS. 5(a) and 5(b) are concept views showing a method for correcting DC level and amplitude of luminance characteristics of a video signal.
Figure 5B:
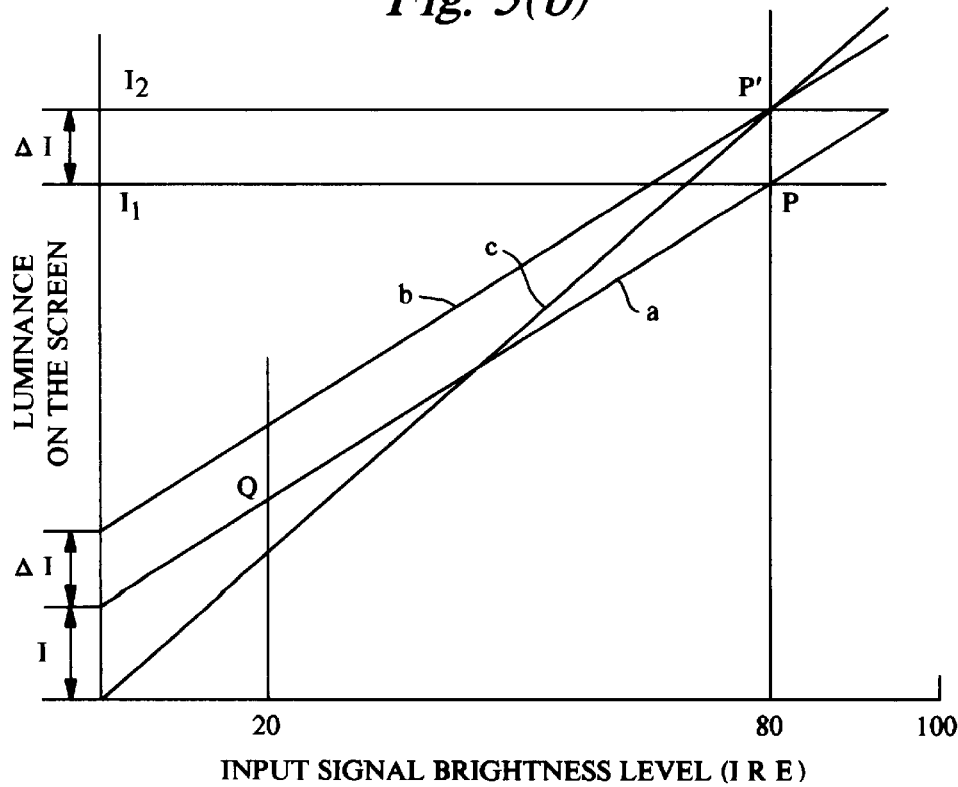

FIGS. 5(a) and 5(b) show luminance characteristics for illustrating the outline of the operation of the correction data computing device 28. The abscissas of FIGS. 5(a) and 5(b) indicate input signal brightnes levels (namely, IRE), and the ordinates indicate luminance level on the screen. In FIG. 5(b), when, for example, point P is measured at 80 IRE and point Q is measured at 20 IRE, since luminance characteristics are $\gamma$-corrected beforehand as mentioned above, the luminance characteristics can be almost linearly approximated as the a-line. The c-line indicates objective luminance characteristics on the screen and is a declining straight line where the luminance on the screen is 0 when the input brightness signal level is 0. When luminance correction is carried out by the data measured at a specific input signal level (for example, 80 IRE) as in a conventional example (e.g., Japanese laid-open patent application 61-243495), the luminance I1 (point P) on the a-line at 80 IRE is increased as much as $\Delta I$ to become the luminance I2 (point P'). In other words, the a-line is shifted parallel as much as $\Delta I$ to become the characteristics of the b-line. This correction, from a hardware point of view, may be easily performed by adding the DC level of $\Delta I$ by an adder. However, the a-line has a luminance deviation I at "0" IRE level with respect to the objective luminance c-line. The luminance at "0" IRE level on the b-line becomes I+$\Delta I$ after correction, so the deviation is increased. In the present invention, to improve the above performance of correction, the amplitude of the video signal (that is to say, the declination of luminance characteristics) is corrected in addition to DC level correction of the video signal.

That is, as shown in FIG. 5(a), luminance point P at 80 IRE and luminance point Q at 20 IRE are measured for an R signal component, a straight line-a connecting P and Q is extended to obtain DC luminance error $\Delta I$ at "0" IRE. Next, the line-a is shifted parallel as much as $\Delta I$ to form line-b, and inclination ratio $\beta$ between line-b and objective luminance line-c is obtained. It is understood that ratio $\beta$ is multiplied on line-b to obtain objective luminance line-c. Accordingly, the DC luminance error component $\Delta I$ and ratio of inclination $\beta$ are computed by correction data computing device 28 in FIG. 4 (for example, composed of a micro computer), and the $\Delta I$ and $\beta$ are simultaneously stored to memory 29 in FIG. 4 as the data for DC level correction data and amplitude correction data. Then, the output of address counter 23 is increased to change the change over circuit 26, and data of G and B signal components are stored in memory 29 in the same manner. Output of the address counter 23 to memory 29 designates the address of the memory corresponding to a divided region on the screen. Next, the address counter for memory 29 is further increased, and the luminance correction data of the next divided region on the screen is stored in memory 29 in the same manner. By repeating these operations, correction data of DC level and amplitude corresponding to each R, G, and B on all over the screen are stored in memory 29.

Data recorded in memory 29 is transferred to memory 5 in FIG. 1 by ordinary memory transfer means.

In FIGS. 5(a) and 5(b), the measured luminance characteristics line-a is DC component corrected first, and then the amplitude component is obtained by adjusting to the inclination of the objective luminance line-c. The reverse procedure is theoretically the same, that is, the amplitude component for adjusting the inclination of the line-a to that of line-c can be requested first, and the DC error component at "0" IRE on the above adjusted line can then be obtained as DC level correction data. In this manner, the order of adder 10a and multiplier 10b in the correction operation circuit in FIG. 1 is switched so that the multiplication processing is carried out before the addition processing.

In the measurement for the luminance correction data, a screen is divided into a matrix structure of equal sizes. However, by devising the structures of address counter 23 in FIG. 4 and the address counter 4 of the projection type image display apparatus in FIG. 1, unequal divided regions can be applied.

In general, the G (green) luminance component in a projection type image display apparatus is dominant. Therefore, if the correction data for G color only is stored in memory 5 in FIG. 1 as the correction data, and the structures of D/A converter circuit 7 and correction operation circuit 10 are designed for corresponding to the G color component only, simpler and lower cost luminance nonuniformity correction apparatus can be realized.

When memory 5 of the present invention shown in FIG. 1 is nonvolatile memory or ROM type and the luminance correction data in memory 29 of the measurement apparatus shown in FIG. 4 is transferred beforehand to memory 5, there is no need to use a luminance measuring apparatus shown in FIG. 4 in a projection type image display apparatus.

According to the first embodiment of the invention, by correcting the brightness of the input video signal by the luminance correction data of both the DC level and amplitude, nonuniformities in luminance and color from a low brightness signal level to a high brightness signal level can be corrected. By using three phase clock signals corresponding to each of the video signals of R, G, and B, the number of memory devices can be reduced thereby resulting in a cost savings.

Figure 6:
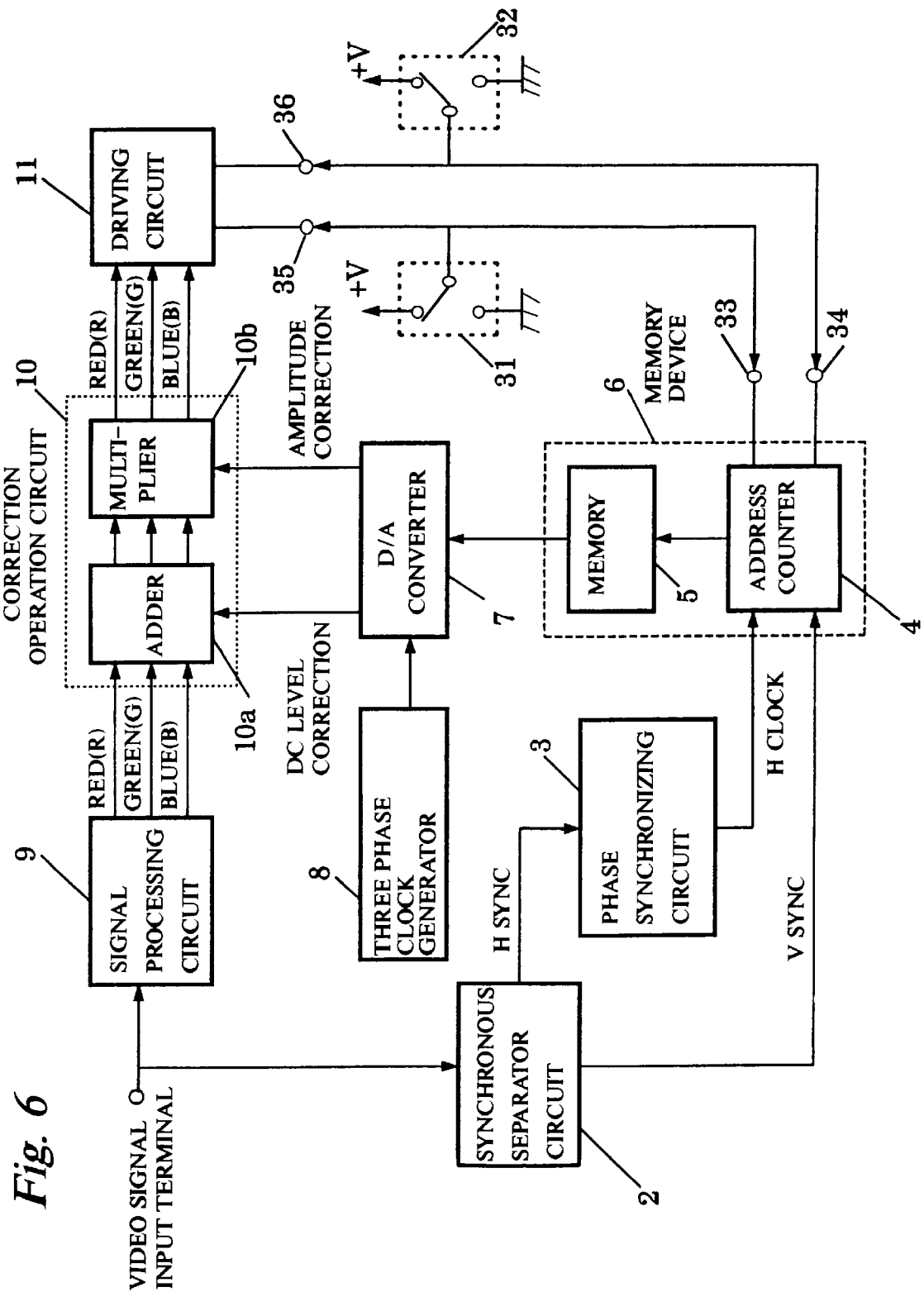
FIG. 6 is a block diagram showing a structure of a projection type image display apparatus in accordance with a second embodiment of the present invention.

FIG. 6 is a block diagram of a projection type image display apparatus in accordance with a second embodiment of the invention. The same elements as in FIG. 1 of the first embodiment of the invention are denoted by the same symbols and they operate in the same manner. Switch 31 is a sweep/count start position control switch connected to sweep start position control terminal 35 of driving circuit 11 and count start position control terminal 33 of address counter 4 for designating an address of memory 5 recording correction data. Switch 32 is a sweep/count direction control switch connected to sweep direction control terminal 36 of driving circuit 11 and count direction control terminal 34 of address counter 4 for designating an address of memory 5. The video signal inputted from video signal input terminal 1 is converted to the color video signals of R, G, and B by signal processing circuit 9. The projection screen surface is divided beforehand into a matrix structure, and the correction data for R, G, and B obtained from the measurement of the luminance nonuniformities of divided regions are stored in memory 5. As the command from switch 31 is inputted to count start position control terminal 33 of address counter 4, read start address of memory 5 is designated, and as the command from switch 32 is inputted to count direction control terminal 34, the read start address and read direction of memory 5 are designated. Address counter 4 also generates address signals corresponding to divided positions of the projection screen by a horizontal synchronous clock obtained from synchronous separator circuit 2 and phase synchronizing circuit 3. The correction data for R, G, and B corresponding to the divided regions on the projection screen are read by inputting the address signals to memory 5.

The correction data, as described in FIG. 1 and FIG. 2, are converted to DC level and amplitude of analog values by D/A conversion of respective R, G, and B, and the value is inputted to adder 10a and multiplier 10b of correction operation circuit 10 so that the input video signal is corrected in every R, G, and B luminance signal.

The corrected luminance signal is inputted to driving circuit 11, and since sweep start position control terminal 35 is designated by switch 31, and sweep direction control terminal 36 is designated by switch 32, the driving circuit is swept in the same direction as the read direction of the correction data of the memory.

In memory 5, the correction data are stored corresponding to the positions of the luminance nonuniformity of R, G, and B on the screen. When front projection and rear projection in a projection type image display apparatus are switched, the direction of horizontal sweep of driving circuit 11 is reversed by switch 32, so the pattern of luminance nonuniformity in the horizontal direction must also be reversed. For this purpose, count direction control terminal 34 of address counter 4 is controlled to reverse the address order in a horizontal direction for reading out correction data from memory 5.

When the installation position, such as floor installing or ceiling mounting, of a projection type image display apparatus is changed, the pattern of luminance nonuniformity reverses in the vertical direction. Sweep start position control terminal 35 and sweep direction control terminal 36 are controlled by switch 31 and 32, and count start position control terminal 33 and count direction control terminal 34 of address counter 4 are controlled to reverse the address order in the vertical direction for reading the correction data from memory 5. Likewise, the correction data of DC level and amplitude corresponding to nonuniformities in luminance and color of a projection screen which change according to projection direction or installation position is successively outputted from memory device 6.

The digital data of DC level and amplitude output from memory device 6 is inputted to D/A converter 7 and converted to an analog signal. The output signal of DC level and amplitude from D/A converter 7 is inputted to adder 10a and multiplier 10b of correction operation circuit 10. Each video signal of R, G, and B, which is outputted from signal processing circuit 9, has its DC levels corrected by adder 10a and its amplitude corrected by multiplier 10b. The corrected signals of R, G, and B are inputted to driving circuit 11 to drive a light valve, so, even if the installation position of a projection type image display apparatus is changed, an image without nonuniformity in luminance and color can be projected on the screen.

According to the second embodiment of the present invention, by performing both DC level and amplitude modulation of a video signal, nonuniformities in luminance and color corresponding to a wide range of input video signal levels from low brightness to high brightness can be corrected. Further, by using a memory device having an address counter capable of designating a read start address and a read direction of memory with the use of change over means such as switch 31 and 32, correction corresponding to the change of projection direction such as front projection and rear projection of a projection type image display apparatus or to the change of installation position such as floor installation or ceiling mounting can be performed.

As described above, in the projection type image display apparatus of the invention comprising: a memory device storing data for correcting nonuniformities in luminance and color of a projected image on the screen for each R, G, and B; a D/A converter for converting correction digital data read from said memory device to an analog signal; and, a correction operation circuit for correcting both the DC level and the amplitude of at least one of the R, G, and B video signals using an output signal from said D/A converter, a wide range of correction of nonuniformities in luminance and color from a low brightness signal level to a high brightness signal level can be performed.

By providing a memory device which stores correction data repeating the order of R, G, and B, a three phase clock generator, and D/A converters for the respective R, G, and B, the amount of memory needed can be reduced and correction of nonuniformities in luminance and color can thus be performed at a low price.

Further, in a projection type image display apparatus, the sweep direction of the driving circuit is changed corresponding to the change of projection direction such as front projection or rear projection and to the change in installation position such as floor installation or ceiling mounting. By just the read start position and the read direction of correction data of the memory to an address counter of the memory device, nonuniformities in luminance and color on the screen can be corrected when the sweep direction is changed.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. A projection type image display apparatus comprising:
   operation means for obtaining digital data comprising a plurality of amplitude and DC level values, each of said values obtained by a straight line approximation for correcting a nonuniformity of luminance for respective physical portions of an image appearing on a screen for at least one of red, green and blue color video signals;
   a memory device for storing said digital data;
   a D/A converter for converting said digital data read from said memory device to an analog signal having a DC level value and an amplitude value; and,
   a correction operation means for correcting said at least one of red, green and blue video signals of said respective physical portions of said image using the DC level value and the amplitude value of the analog signal of said D/A converter;
   wherein the DC level and the amplitude of the at least one of red, green, and blue video signals of said respective physical portions of said image are corrected by said correction operation means.

2. The projection type image display apparatus of claim 1, wherein said correction operation means includes a multiplier and an adder, and
   wherein said correction of the amplitude and the DC level is performed using said multiplier and said adder.

3. The projection type image display apparatus of claim 1, wherein a three phase clock signal corresponding to each of the at least one of red, green, and blue video signals is used to read said digital data from said memory device.

4. A projection type image display apparatus comprising:
   operation means for obtaining digital data comprising a plurality of amplitude and DC level values, each of said values obtained by a straight line approximation for correcting a nonuniformity of luminance for respective physical portions of an image appearing on a screen for at least one of red, green and blue color video signals;
   a memory device for storing said digital data, said memory device capable of being assigned a read start position and a read direction;
   a D/A converter for converting said digital data read from said memory device to an analog signal having a DC level value and an amplitude value; and,
   a correction operation means for correcting said at least one of red, green and blue video signals of said respective physical portions of said projected image using the DC level value and the amplitude value of the analog signal from said D/A converter,
   wherein the DC level and the amplitude of the at least one of red, green, and blue video signals of said respective physical portions of said projected image are corrected by said correction operation means.

5. The projection type image display apparatus of claim 4, wherein the assignment of read direction is performed with a linking to a change over means of a sweep direction of the projection type image display apparatus.

6. The projection type image display apparatus of claim 4, wherein said correction operation means includes a multiplier and an adder, and
   wherein said correction of the amplitude and the DC level is performed using said multiplier and adder.

7. The projection type image display apparatus of claim 4, wherein a three phase clock signal corresponding to each of the at least one of red, green, and blue video signals is used to read said digital data from said memory device.

8. A projection type image display apparatus comprising:
   operation means for obtaining digital data comprising a plurality of amplitude and DC level values, each of said values obtained by a straight line approximation for correcting a nonuniformity of luminance for respective physical portions of an image appearing on a screen for at least one of red, green and blue color video signals;
   memory means for storing said data; and
   means for reading said data from said memory means; and
   means for multiplying and adding said data measured at the respective one of the plurality of physical regions to an input video signal.

9. A projection type image display apparatus comprising:
   means for measuring a plurality of luminance characteristics at a plurality of divided regions on a projection screen, while an input video signal level changes;
   operation means for obtaining data comprising an amplitude and a DC level obtained by a straight line approximation from said luminance characteristics measured by said means for measuring;
   memory means for storing said data;
   read means for reading said data from said memory means; and
   means for adding and multiplying said data to an input video signal.

10. A projection type image display apparatus comprising:

means for approximating a plurality of luminance characteristics on a projection screen to a straight line;

inclination determining means for determining an inclination of said straight line of the luminance characteristics; and parallel shift determining means for determining an amount of parallel shift in the luminance direction of the luminance characteristics which was approximated to the straight line;

wherein an amplitude of an input video signal is controlled by data determined by said inclination determining means, and a DC level of the input video signal is controlled by said parallel shift determining means.

* * * * *